United States Patent [19]

Mitchell et al.

[11] Patent Number: 4,832,419
[45] Date of Patent: May 23, 1989

[54] ADJUSTABLE DISPLAY PANEL FOR PORTABLE COMPUTER

[75] Inventors: Tom Mitchell, Houston; Gary L. Williams, Tomball; Richard V. Haner, Houston, all of Tex.

[73] Assignee: Compaq Computer Corporation, Houston, Tex.

[21] Appl. No.: 240,438

[22] Filed: Sep. 2, 1988

Related U.S. Application Data

[63] Continuation of Ser. No. 4,335, Jan. 15, 1987, abandoned.

[51] Int. Cl.$^4$ ............................................. A47B 81/06
[52] U.S. Cl. ..................................... 312/7.2; 248/1 B; 312/208; 312/328; 358/254
[58] Field of Search ....................... 312/7.2, 24, 25, 28, 312/29, 138 R, 208, 325, 328, 242; 358/254, 255; 248/1 A, 1 B, 1 C, 1 I, 672, 676, 274

[56] References Cited

U.S. PATENT DOCUMENTS

| | | | |
|---|---|---|---|
| 1,219,404 | 3/1917 | Smith | 312/138 R |
| 1,855,953 | 4/1932 | Friedrich | 312/138 R X |
| 2,438,022 | 3/1948 | Rundle | 312/7.2 X |
| 2,476,494 | 7/1949 | Jones et al. | 358/254 |
| 3,075,819 | 1/1963 | Liegeon et al. | 312/325 X |
| 4,294,496 | 10/1981 | Murez | 312/208 |
| 4,350,399 | 9/1982 | Berton et al. | 312/138 R |
| 4,491,979 | 1/1985 | Ogasawara et al. | 312/24 X |
| 4,552,418 | 11/1985 | Sarnezki et al. | 312/242 |
| 4,633,323 | 12/1986 | Haberkern et al. | 358/254 |
| 4,652,932 | 3/1987 | Miyajima et al. | 358/254 X |

FOREIGN PATENT DOCUMENTS

| | | | |
|---|---|---|---|
| 58242 | 8/1982 | European Pat. Off. | 312/7.2 |
| 3202046 | 7/1983 | Fed. Rep. of Germany | 358/254 |
| 581916 | 9/1958 | Italy | 312/7.2 |
| 245626 | 11/1946 | Switzerland | 312/25 |
| 833353 | 4/1960 | United Kingdom | 312/7.2 |

Primary Examiner—Kenneth J. Dorner
Assistant Examiner—Thomas A. Rendos
Attorney, Agent, or Firm—J. David Cabello; Christopher D. Keirs

[57] ABSTRACT

A mechanism for adjusting the height and viewing angle of a flat panel display which is viewed in conjunction with a portable personal computer. The mechanism includes a pair of arms that swing the display panel between the lowered and raised position, cooperating with a cam wheel moveable in a cam track. In a raised position, the flat panel display may be adjusted in viewing angle. In a lowered position the flat panel display may be securely latched to the portable personal computer to protect the display from damage.

15 Claims, 3 Drawing Sheets

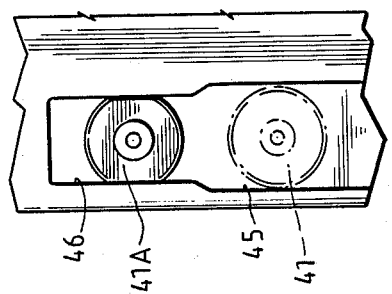
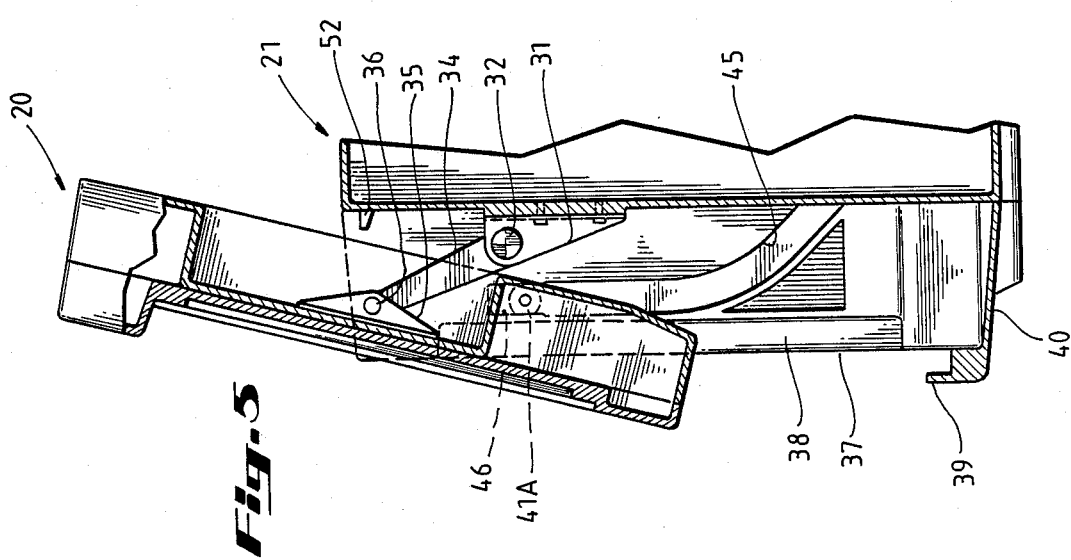
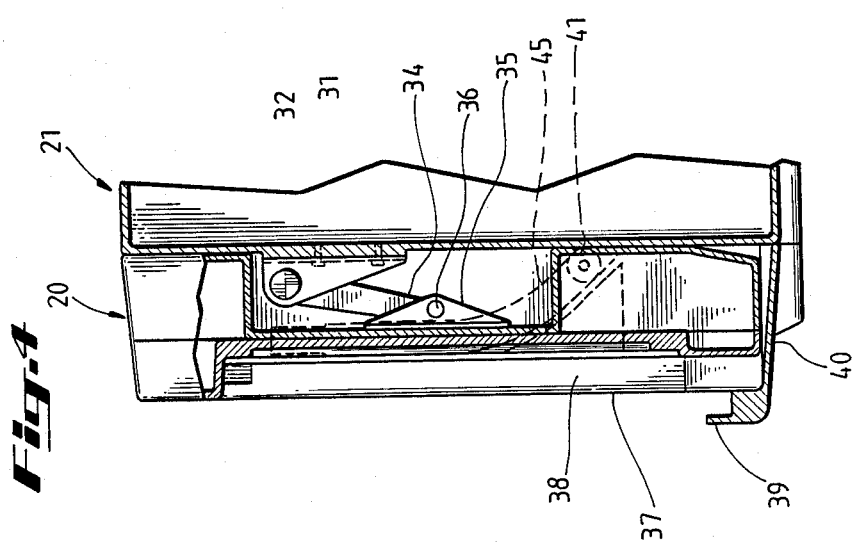

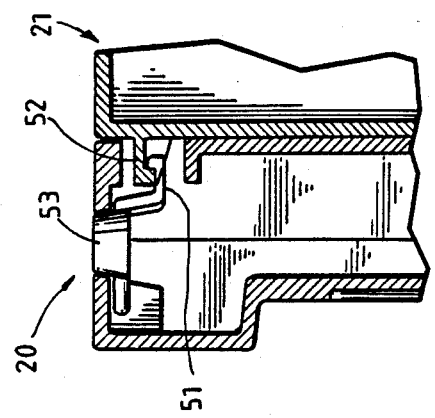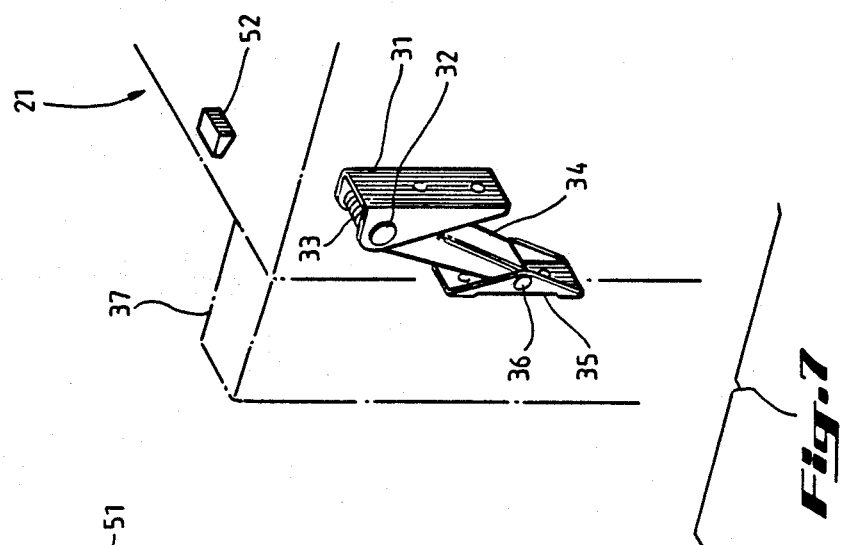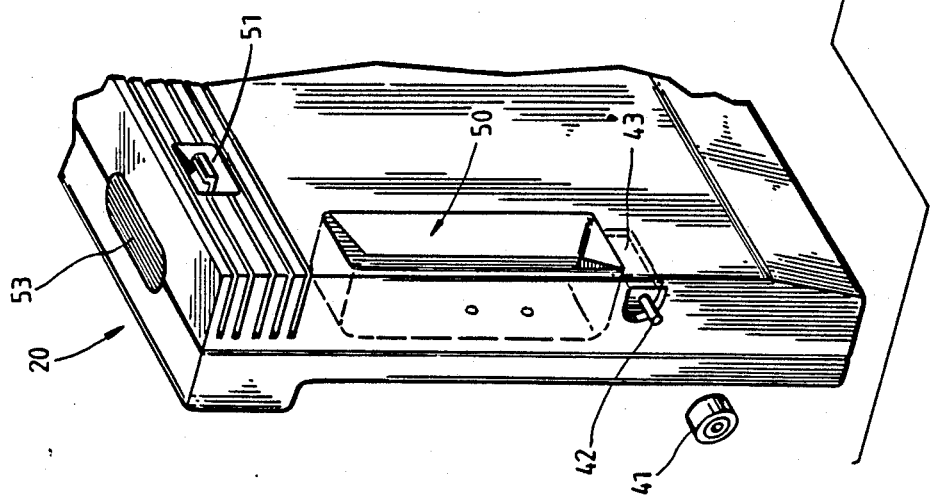

ADJUSTABLE DISPLAY PANEL FOR PORTABLE COMPUTER

This is a continuation of co-pending application Ser. No. 004,335 filed on Jan. 15, 1987, now abandoned.

BACKGROUND OF THE INVENTION

1. Field of the Invention

This invention relates generally to display panels for computers and in particular to a display panel mechanism for portable computers for adjusting height and viewing angle of a flat panel display.

2. Description of the Related Art

Display panels, especially flat panel displays, have been used to display text and figures generated during use of portable computers. In many portable computers the display panel has been integral with the computer frame. In other portable computers, to protect the front screen of the display panel from potential damage, the display panel has been folded or hinged against the computer frame to shield the screen when the portable computer is not in use. In addition to protecting the front screen of the display panel from abuse, the folding display mechanism permits limited adjustment of viewing angle. However, the hinged display panel has several drawbacks including inability to adjust the height of the display panel in relation to the computer frame. Additionally, many hinged display panels were not supported solidly at a single hinged axis to resist inadvertent movements.

For other applications such as larger non-portable computers, adjustment of the height and viewing angle has been facilitated by a display panel mounted on a pedestal or tilt stand. However the arm or tilt stand has been too bulky for portable applications and too expensive for many small portable computers.

Attempts have been made at providing ergonomically adjustable display panels which can be adjusted for each different operator and may be portable for a personal computer. The ergonomic needs of the operator have not been fully satisfied because adjusting mechanisms for portable computers are too bulky and expensive. Operators of portable personal computers thus have experienced eye fatigue and eye strain as well as back and neck fatigue because the display panel is anchored at a position uncomfortable to the operator. In addition, because the display panel is not adjustable in both height and viewing angle, glare from ambient lighting and screen reflections may cause viewing problems for the operator of a flat panel display of a portable personal computer.

SUMMARY OF THE INVENTION

The object of the invention is to overcome the disadvantages of the prior art in a manner which is simple and inexpensive to manufacture. More particularly the present invention provides a flat panel display which is adjustable in height and viewing angle while being securely fastened in a raised or lowered position as desired.

The simple adjustment mechanism of the present invention makes it possible to keep the panel display component lightweight and essentially separable from the computer proper. The combination of features also helps to provide the operator with less eye strain, better working posture and less fatigue.

The invention is directed to a mechanism for adjusting the height and display angle of a flat panel display for a portable personal computer. The display panel is supported by hinged arms on each side of the display panel. The movement of the display panel is also guided with a cam movable in a cam track. A cam is mounted on each side of the display panel and a matching track is located on each side of a side panel on the portable computer frame. When in a lowered position, the display panel is anchored securely on the compute frame between two side panels and a lower panel for protection of the display panel screen. A latch mechanism anchors the display panel when in a lowered position proximate to the computer frame.

Accomplishment of the invention will become more apparent from the following description and drawings, setting forth in detail certain illustrative embodiments of the invention. These embodiments, however, are merely indicative of but a few of the various ways in which the principles of the invention may be employed.

BRIEF DESCRIPTION OF THE DRAWINGS

FIG. 4 is a side view, partially in section, of the adjustable display panel in a lowered position nestled in the computer frame.

FIG. 5 is a side view, partially in section, of the adjustable display panel in a raised position.

FIG. 6 is a sectional side view of the cam follower and cam track.

FIG. 7 is a partially exploded perspective view of the adjustable display panel and support mechanism.

FIG. 8 is a sectional side view of the latch mechanism used for the adjustable display.

DESCRIPTION OF THE PREFERRED EMBODIMENT

Figure 1:
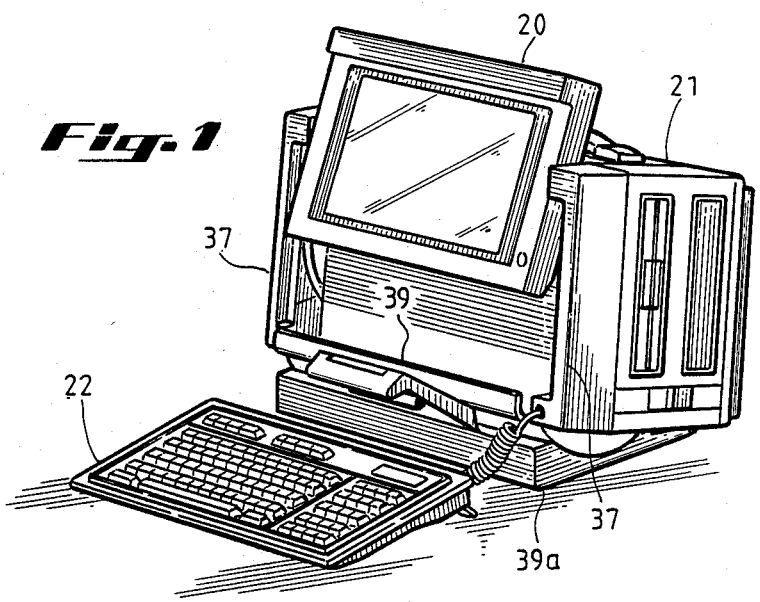
FIG. 1 is a perspective view of a portable computer frame showing the adjustable display panel in a raised position.
Figure 2:
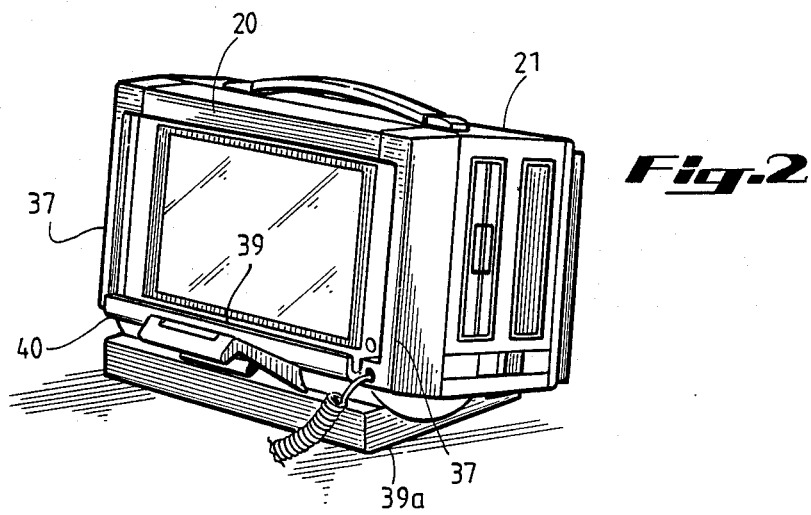
FIG. 2 is a perspective view of a portable computer frame showing the adjustable display panel in a lowered position nestled in the computer frame.
Figure 3:
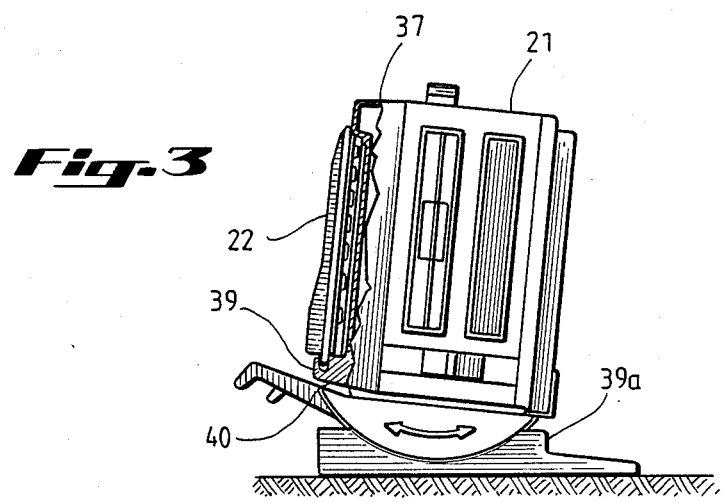
FIG. 3 is a side view, partially in section, of the portable computer frame showing the adjustable display panel and keyboard in a lowered position, both nestled in the computer frame.

Referring now in detail to the drawings and initially to FIG. 1, reference number 20 generally indicates a display panel shown as a flat panel display in accordance with the preferred embodiment of the present invention. The flat panel display 20 is mounted proximate to a portable computer frame 21 which may include a central processing unit and storage device. Although in the preferred embodiment, the computer frame 21 is shown as a portable unit, it should be understood that the apparatus of the present invention is not so limited. It will also be understood that the necessary electrical connections between the flat panel display 20 and the portable computer frame 21 are well known to those skilled in the art. In view of this fact, and in order to better illustrate the principles of the present invention, it was decided not to show the connections between the display and computer frame. Also shown in FIG. 1 is keyboard 22 which is electrically connected to portable personal computer 21. In FIG. 1 the flat panel display 20 is in a partially raised position with the viewing angle positioned in one of a variety of positions for comfortable viewing by the operator. Also shown in FIG. 1 are side-panels 37 and lower panel lip 39 which will be discussed in more detail below. Also shown in FIGS. 1, 2 and 3 is a detachable computer pedestal or stand 39a. Stand 39a permits frame 21 to be tilted to further increase the viewing angle of screen 20 by rotating pedestal or stand in the direction illustrated by the arrows in FIG. 3.

FIG. 2 illustrates the preferred embodiment of the present invention in which the display panel 20 is in a lowered position between side panels 37 and lower panel 40. In the lowered position the flat panel display is nestled within the side panels and lower panel at the front of the computer frame.

FIG. 3 also illustrates the flat panel display in a lowered position between side panels 37 and lower panel 40 in the preferred embodiment of the present invention. As shown in FIG. 3, when the computer is not being used keyboard 22 also may be attached to the computer frame adjacent to the flat panel display. The lower panel lip 39 matches the lower edge of the keyboard 22 to anchor the keyboard to the computer frame. Thus the flat panel display and keyboard may be anchored securely to the computer frame when not being used for simplicity and portability without risk of damage to either the keyboard or the flat panel display.

Now referring to FIG. 4, the flat panel display is shown generally at 20 and the computer frame is shown at 21. In FIG. 4 the flat panel display is shown in a lowered position nestled between side panels 37 and lower panel 40 of the computer frame. Also shown in FIG. 4 is keyboard seat 38 and lower lip 39 for anchoring the keyboard in place. The mechanism for raising and lowering and supporting the flat panel display is shown in detail in FIGS. 4 and 5. The mechanism includes computer frame bracket 31 and along with computer frame bracket pin 32. The computer frame bracket is mounted with screws or other fastening means securely to the computer frame. One end of support arm 34 pivots on the computer frame bracket pin 32. The other end of support arm 34 pivots on flat panel support bracket pin 36 which is mounted to flat panel support bracket 35. The flat panel support bracket 35 is securely mounted to the flat panel display with screws or other fastening means. As shown in FIG. 7, the computer frame bracket pin 32 is provided with concentric spring 33 to urge the support arm into a raised position to raise the flat panel display. In the preferred embodiment two support arms and hinged mechanisms are used. It should be understood, however, that one or more the arm support mechanisms may be used in the present invention.

Also shown in FIG. 4 is cam wheel 41 in a lowered position within cam track 45. As the flat panel display is raised or lowered, the cam wheel is moved within the cam track, which is located within the opposing sides of the side panel 37. The cam track provides, in effect, a cam surface which is contoured to provide smooth movement and positioning of the display relative to the computer frame. In the preferred embodiment, the track is curved at about 45° angle, although the shape of the track may be varied substantially. As explained earlier, it is generally desirable that the track be configured to enable the display to exit and re-enter the nestled position with a smooth, controlled movement.

FIG. 5 shows the flat panel display 20 in a raised position. As shown in FIG. 5, one end of support arm 34 pivots at computer frame bracket pin 32 and the opposing end pivots at flat panel support bracket pin 36. Thus the flat panel display 20 may be supported in a raised position relative to computer frame 21. In the preferred embodiment, as the flat panel is raised cam wheel 41 rotates as it moves upward along cam track 45. It will be understood that rotation of the cam wheel is not essential to the invention; a non-rotating cam lobe also could be used according to the present invention. The cam track provides stability so that the flat panel display may be raised in a smooth manner outwardly from the computer and remain solidly and securely in place. At the uppermost end of cam track 45 is narrowed cam track 46. Narrowed cam track 46 is dimensioned such that cam wheel 41 is partially compressed to fit within the track as shown at 41A. Preferably cam wheel 41 is made of a compressible and resilient material so that it tightly fits within the narrowed cam track 46 and helps hold the display panel securely in place in the raised position. In the raised position as shown in FIG. 5, the flat panel display may be pivoted about the computer frame bracket pin 32 while anchored securely by cam wheel 41A within narrowed cam track 46. Preferably the narrowed portion of cam track 46 permits some travel of the cam wheel 41A in the partially compressed state. When in the partially compressed state, the cam wheel 41A moves within narrowed cam track 46 with some resistance rather than rolling freely as in the wider portion of the cam track 45, which has a width preferably slightly greater than the diameter of the cam wheel 41. The compressible cam wheel thus fits snugly within the narrowed cam track 46 and thereby resists inadvertent movements.

Now referring to FIG. 6, cam wheel 41 is shown within cam track 45 wherein the width of the cam track is of sufficient width to permit the cam wheel 41 to roll up the cam track. Also shown in FIG. 6 is partially compressed cam wheel 41A and narrowed cam track 46 while the flat panel display is a raised position.

Now referring to FIG. 7 which illustrates a partially exploded view of the present invention, the flat panel display 20 is shown disassembled from computer frame 21. Also shown in FIG. 7 is computer frame bracket 31, computer frame bracket pin 32, support arm 34, flat panel support bracket 35 and flat panel support bracket pin 36. To urge the flat panel display into a raised position, the computer frame bracket pin 32 includes spring 33 concentric with the pin. Still referring to FIG. 7, the cam wheel assembly includes cam wheel 41, cam wheel shaft 42 and cam wheel housing 43 which is anchored to flat panel display 20. Cam wheel 41 in cooperation with shaft 42 further permits the tilting of screen 20 when wheel 41 is in the narrow portion 46 of the cam track.

Also shown in FIG. 7 is flat panel support bracket recess 50 into which the flat panel support bracket 35 is mounted. To anchor the flat panel display to the computer frame when not being used, the flat panel display includes flat panel display latch 51 and latch release tab 53. The flat panel display latch 51 hooks on latch seat 52 which is provided in the front of the computer frame 21. To release the latch, latch release tab 53 is depressed. Thus the flat panel display may be latched securely to the computer frame.

FIG. 8 shows the latch release mechanism in more detail. Flat panel display latch 51 is hooked into latch seat 52 to anchor the flat panel display securely to the computer frame 21. Latch release tab 53 may be depressed to unhook the latch from the latch seat 52.

The preferred invention contemplates a pivoting support arm cooperating with a cam moveable in a track to solidly and securely provide for raising and lowering a flat panel display in relation to a portable computer frame. The flat panel display in a raised position may be tilted at any angle desired by the operator for viewing to accommodate the ergonomic needs of the operator. The cam and cam follower mechanism provides for smooth raising and lowering of the display panel, and at the raised position, a narrowed portion of the cam track securely holds the flat panel display in position for tilting the display at a variety of different angles and holding it in that position.

While the foregoing description has been directed to manual operation of the several pivoting actions of the present invention, it will be recognized that these actions are readily susceptible to powered or power assisted movements if so desired. Thus, the use of constant force springs, spring motors, servo motor systems, and the like are contemplated when the panel displays and their computers are so large or heavy as to make such use attractive.

Although the best mode contemplated for carrying out the present invention has been herein shown and described, it will be appreciated that variations and modifications may be made without departing from what is regarded to be the subject matter of the present invention.

What is claimed is:

1. A computer display panel mechanism comprising:
   a display panel;
   a computer frame for receiving the display panel in a first position in close relation thereto;
   at least one arm for supporting the display panel at a second position extended outwardly from the computer frame, the arm having a first end hinged to the computer frame and a second end hinged to the display panel;
   at least one cam lobe mounted to the display panel; and
   at least one cam track on the computer frame for guiding the cam lobe as the display panel is moved between the first position and the second position such that the display panel is viewable in both the first position and the second position and the display panel when in the second position is substantially parallel to the position of the display panel in the first position.

2. The display panel mechanism according to claim 1 further including bias means between the display panel and the computer frame for urging the display panel toward the second position.

3. The display panel mechanism according to claim 1 further including releasable latch means for latching the display panel in a first position, the latch means comprising mutually engaging elements on the display panel and computer frame.

4. The display panel mechanism according to claim 1 wherein the cam lobe is resilient.

5. The display panel mechanism according to claim 1 wherein the cam track comprises a first wide track portion, a second narrow track portion, the width of the narrow track portion being less than the width of the uncompressed cam lobe, and at least one end portion which prevents further movement of the cam lobe.

6. The display panel mechanism according to claim 5 wherein the cam lobe is compressed within the narrow track portion when the display panel is in the second position and uncompressed in the wide track portion when the display panel is moved between the first and second positions.

7. The display panel mechanism according to claim 5 wherein the cam lobe comprises a compressible cam wheel rotatably mounted to the display panel; the cam wheel rotating freely within the wide track portion when the display panel is moved between the first and second position, the cam wheel tightly squeezing within the narrow track portion when the display panel is in the second position.

8. The display panel mechanism according to claim 1 wherein the display panel is tiltable in relation to the computer frame when the display panel is in the second position.

9. The display panel mechanism according to claim 1 wherein the cam lobe comprises a cam wheel rotatably mounted to the display panel.

10. A display panel mechanism for a portable computer comprising:
    a flat panel display having a front, back and opposing sides;
    a computer frame having opposing side panels and a lower panel extending from the front of the computer frame for receiving the flat panel display in a nestled position between the opposing side panels and lower panel of the computer frame;
    a pair of arms supporting the flat panel display in a raised position extended outwardly from the computer frame, each arm having a first end and a second end; the first end pivotably mounted to the back of the flat panel display and the second end pivotably mounted to the front of the computer frame;
    a pair of compressible and rotatable cam wheels mounted to the opposing sides of the flat panel display; and
    a pair of cam tracks on the opposing side panels of the computer frame, the cam tracks having a wide track portion and a narrow track portion wherein the cam wheels are rotatable within the wide track portion when the display panel is moved between the nestled position and the raised position and are compressed within the narrow track portion when the display panel is in the raised position.

11. The display panel mechanism according to claim 10 wherein the flat panel display is tiltable at an angle when in the raised position.

12. The display panel mechanism according to claim 10 wherein each cam track is curved.

13. The display panel mechanism according to claim 10 further including mutually engaging elements on the flat panel display and the computer frame for securing the flat panel display to the front of the computer frame in a nestled position between the opposing side panels and lower panel.

14. The display panel mechanism according to claim 10 wherein the opposed side panels and lower panel are configured for receiving a keyboard in a nestled position proximate to the flat panel display.

15. The display panel support mechanism comprising:
    a frame configured to receive a display panel in a first position in close relation thereto;
    a display panel mounted on the frame such that it is movable between a first position and a second position;
    at least one cam lobe mounted to the display panel; and at least one cam track on the frame configured to guide the cam lobe as the display panel is moved between the first position and the second position, the track having a wide portion wherein the cam lobe can move freely and a narrow portion having a width less than the width of the uncompressed cam lobe wherein the cam lobe is compressed and, as a result of such compression, movement of the cam lobe is resisted.

* * * * *